(12) United States Patent
Benham (10) Patent No.: US 6,923,940 B2
(45) Date of Patent: Aug. 2, 2005

(54) RISER TERMINATION DEVICE (75) Inventor: Kelly Benham, Calgary (CA)

(73) Assignee: Stone & Webster Process Technology, Inc., Houston, TX (US)

( * ) Notice: Subject to any disclaimer, the term of this patent is extended or adjusted under 35 U.S.C. 154(b) by 200 days.

(21) Appl. No.: 10/616,660

(22) Filed: Jul. 10, 2003

(65) Prior Publication Data

US 2004/0105790 A1 Jun. 3, 2004

Related U.S. Application Data (63) Continuation of application No. 10/100,971, filed on Mar. 19, 2002, now Pat. No. 6,692,552.
(60) Provisional application No. 60/277,336, filed on Mar. 20, 2001.

(51) Int. Cl.[7] .............................. B01J 8/08; B01J 8/18; B01D 45/12
(52) U.S. Cl. ...................... 422/147; 422/145; 422/144; 422/232; 96/150; 96/143; 96/144; 55/345; 55/490
(58) Field of Search .............................. 422/139, 143, 422/144, 145, 147, 232, 233; 96/150, 143, 144; 55/345, 490

(56) References Cited

U.S. PATENT DOCUMENTS

| | | | |
|---|---|---|---|
| 2,737,479 A | 3/1956 | Nicholson |
| 2,878,891 A | 3/1959 | Ross et al. |
| 3,074,878 A | 1/1963 | Pappas |
| 3,835,029 A | 9/1974 | Larson |
| 4,288,235 A | 9/1981 | Gartside et al. |
| 4,348,364 A | 9/1982 | Gartside et al. |
| 4,433,984 A | 2/1984 | Gartside et al. |
| 4,756,886 A | 7/1988 | Pfeiffer et al. |
| 4,961,863 A | 10/1990 | Van Den Akker et al. |
| 5,259,855 A | 11/1993 | Ross et al. |

*Primary Examiner*—Alexa Doroshenk
(74) *Attorney, Agent, or Firm*—Hedman & Costigan, P.C.

(57) ABSTRACT

A bath tub solids container for containing solids separated from cracked product vapors produced in a riser reactor and issuing from a separator. The bath tub solids container receives and contains solids from the separator, has a collar which fits around the riser reactor to keep the solids from contacting the riser reactor, an aeration device for fluidizing the solids within the container and an outlet for the solids.

3 Claims, 12 Drawing Sheets

RISER TERMINATION DEVICE

CROSS REFERENCE TO RELATED APPLICATIONS

The present invention claims priority from U.S. Provisional Patent Application Ser. No. 60/277,336, filed Mar. 20, 2001. The present application is a continuation of U.S. patent application Ser. No. 10/100,971, filed Mar. 19, 2002, now U.S. Pat. No. 6,692,552.

FIELD OF THE INVENTION

The present invention relates to the field of riser termination devices and more particularly to the field of separating mixed phase gas-solid streams in hydrocarbon cracking units. The present invention also relates to improved stripping operations in hydrocarbon cracking units, such as fluid catalytic cracking (FCC) units.

BACKGROUND OF THE INVENTION

Chemical reaction systems utilizing solids in contact with gaseous or vaporized feedstocks have long been employed. The solids may participate in the reaction as a catalyst, provide heat required for an endothermic reaction, or both. Alternatively, the solids may provide a heat sink required for an exothermic reaction. The terms, solid and catalyst are used interchangeably herein. Similarly, the terms gas and vapors are used interchangeably herein.

In the past, cracking of petroleum products was performed in fluidized bed reactors that had as an advantage a relatively isothermic temperature profile. However, as catalysts improved and residence times decreased, the bed depth became shallower and increasingly unstable. For this reason tubular reactors employing solid-gas contact in pneumatic flow were developed and have been used with great success particularly in the catalytic cracking of hydrocarbons to produce gasoline products where reactor residence time is less than 0.5 to 5 seconds, optimally less than 2 seconds.

In general, catalytic cracking of relatively high boiling hydrocarbons to form substantial quantities of material boiling in the gasoline range is carried out in the following sequence as described in Pfeiffer et al., U.S. Pat. No. 4,756,886, which is incorporated herein by reference: hot regenerated catalyst is contacted with a hydrocarbon feed in a reaction zone under conditions suitable for cracking; the cracked hydrocarbon gases are separated from the spent catalyst using conventional cyclones and the spent catalyst is steam stripped to remove hydrocarbons and subsequently fed to a regeneration chamber where a controlled volume of air is introduced to burn the carbonaceous deposits from the catalyst, and the regenerated catalyst is returned to the reaction zone.

A problem with these fluidized catalytic cracking systems has been obtaining rapid and efficient separation of the gas and solid phases. Another problem has been the efficient re-aeration and stripping of separated spent catalyst particles.

Previous attempts have been made in the art to separate the phases by use of centrifugal force or deflection means. Nicholson, U.S. Pat. No. 2,737,479, combines reaction and separation steps within a helically wound conduit containing a plurality of complete turns and having product draw-offs on the inside surface of the conduit to separate solids from the gas phase by centrifugal force. Solids accumulate on the outside of the conduit, while gases concentrate at the inner wall, and are removed at the draw-offs. The Nicholson unit produces a series of gas product streams each in a different stage of feed conversion due to the multiple product draw offs That cause varying exposure time of the gas to the reaction conditions.

Ross et al., U.S. Pat. No. 2,878,891, attempted to overcome this defect by appending to a standard riser a modification of Nicholson's separator. Ross et al. teach a separator comprised of a curvilinear conduit making separation through a 180° to 240° turn. Centrifugal force directs the heavier solids to the outside wall of the conduit allowing gases that accumulate at the inside wall to be withdrawn through a single drawoff. While the problem of various stages of conversion of the product is decreased, other drawbacks of the Nicholson unit are not eliminated.

Both devices effect separation of gas from solids by changing the direction of the gas 90° at the withdrawal point, while allowing solids to flow linearly to the separator outlet. Because solids do not undergo a directional change at the point of separation, substantial quantities of gas flow past the withdrawal point to the solids outlet. For this reason, both devices require a conventional separator at the solids outlet to remove excess gas from the solid particles. However, product gas removed in the conventional separator has remained in intimate contact with the solids, and is, therefore, severely degraded.

Another drawback of these devices is the limitation on scale-up to commercial size. As conduit diameter increases, the path traveled by the mixed phase stream increases proportionately so that large diameter units have separator residence times approaching those of conventional cyclones. Increasing velocity can increase residence time, but as velocities exceed 60 to 75 ft/sec, erosion by particles impinging along the entire length of the curvilinear path becomes progressively worse. Reduction of the flow path length by decreasing the radius of curvature of the conduit also reduces residence time, but increases the angle of impact of solids against the wall thereby accelerating erosion.

Pappas, U.S. Pat. No. 3,074,878, devised a low residence time separator using deflection means wherein the solid gas stream flowing in a tubular conduit impinges upon a deflector plate causing the solids, which have greater inertia, to be projected away from a laterally disposed gas withdrawal conduit located beneath said deflector plate. Because solids do not change direction while the gas phase changes direction relative to the inlet stream by only 90° there results an inherently high entrainment of solids in the effluent gas. While baffles placed across the withdrawal conduit reduce entrainment, these baffles as well as the deflector plate are subject to very rapid erosion in severe operating conditions of high temperature and high velocity. Thus, many of the benefits of the separators of the prior art are illusory because of the limitations in their efficiency, operable range, and scale up potential.

Gartside et al., U.S. Pat. Nos. 4,288,235, 4,348,364 and 4,433,984, disclosed an apparatus for rapidly separating particulate solids from a mixed phase solids-gas stream from tubular type reactors. Separation is effected by projecting solids by centrifugal force against a bed of solids as the gas phase makes a 180° directional change. The solids phase, however, is required to undergo two 90° degree changes before exiting the apparatus.

Larson, U.S. Pat. No. 3,835,029, discloses a downflow catalytic cracker entering a cylindrical separator with a series of openings in the outside wall through which the hydrocarbon passes. The catalyst solids pass downwardly to a stripper section and then into a regenerator. Within the equipment and spatial constraints, the separator of Larson is limited because there is no progressively increasing lateral flow path as a function of the height of the openings to help effectuate separation once the mixed phase gas solids stream enters the separator.

Pfeiffer, U.S. Pat. No. 4,756,886, teaches a rough cut separator that has a frusto-conical chamber having substantially conical walls tapering downwardly and outwardly and means defining at least one opening in said conical walls for conveying solids free gas.

Other more recent separators are disclosed in Ross et al., U.S. Pat. No. 5,259,855; and Van der Akker et al., U.S. Pat. No. 4,961,863. Although these separation devices have met with some success, there still exists a need in the art for more improved devices, especially those which can facilitate stripping of hydrocarbons from the catalyst particles prior to regeneration.

SUMMARY OF THE PRESENT INVENTION

Accordingly, such an improved riser termination device is provided by the present invention. The device of the present invention comprises:

a) an integrated three stage catalyst separation unit for separating solids from gas, the separation unit comprising:
   (1) a first separation stage comprising: (i) a substantially cylindrical inlet downcomer pipe having an inlet, and a downcomer having a vertical window located in a lower portion of the downcomer; (ii) a catalyst distribution plate operatively connected to said downcomer floor; (iii) a vapor outlet duct located operatively connected to the window and extending upwardly and concentric to the downcomer pipe; and (iv) a catalyst outlet operatively connected to the catalyst distribution plate;
   (2) a second catalyst separation stage comprising a short radius curvature at the downcomer window outlet opening into the vapor outlet duct that allows the gases to separate from the catalyst plated out against the vapor outlet duct wall and turn upwards while the plated out catalyst slows down and exits through a shave-off window and drops through an internal dipleg to the catalyst distribution plate along with the catalyst from the first catalyst separation stage; and
   (3) a third catalyst separation stage comprising a catalyst vent formed by a converging channel formed between the back of the first stage downcomer and the vapor outlet duct inner wall above the internal catalyst dipleg; and b) a crossover duct for connecting a riser reactor to the inlet of the downcomer.

A further embodiment of the present invention provides a riser termination device further comprised of a bath tub for receiving separated catalyst from the catalyst outlet for re-aerating the separated catalyst.

The present invention also provides a bath tub device for re-aerating catalyst separated from cracked product vapors in a separator comprising:

a containment means for receiving and containing catalyst from the separator;

an aeration means for fluidizing catalyst contained in the containment means;

a fluidized catalyst outlet for allowing fluidized catalyst to exit the containment means; and a support means for supporting the containment means in a riser disengager vessel.

In preferred embodiments, the aeration means injects steam into the catalyst thereby allowing dilute phase stripping of the catalyst to occur as the fluidized catalyst exits the containment means, and thereby providing an improved spent catalyst stripping system and process.

These and other objects of the invention will be apparent to those of ordinary skill in the art from an inspection of the specification, figures and claims.

DETAILED DESCRIPTION AND DESCRIPTION OF THE PREFERRED EMBODIMENTS

Figure 1:
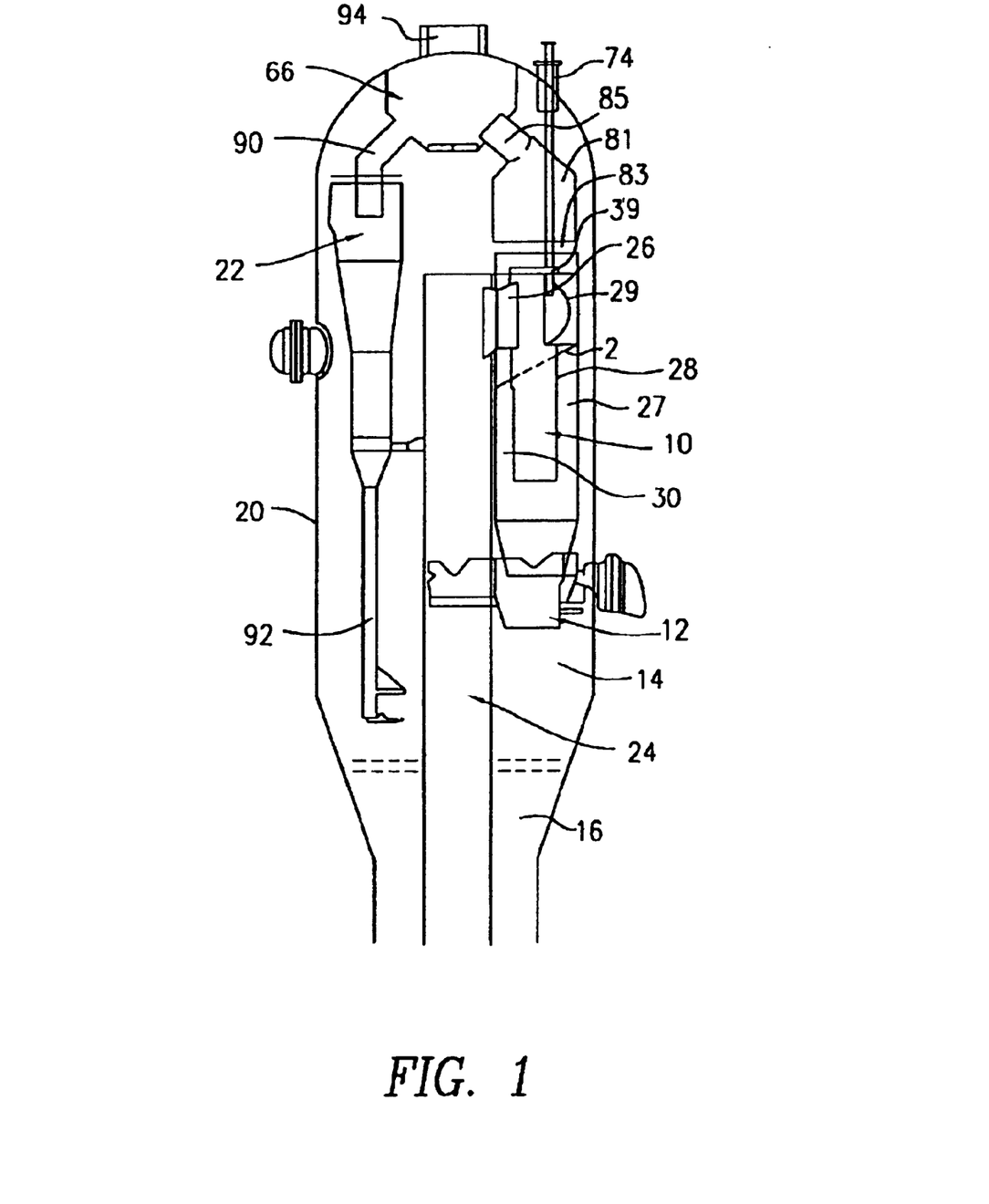
FIG. 1 is a longitudinal section of a preferred riser terminator of the present invention.

FIG. 1 is a longitudinal sectional diagram showing a riser disengaging vessel 20 having a centrally positioned riser 24 and a separation unit 10 of the present invention. The separation unit 10 is equipped with an internal downcomer pipe 28 that preferably runs parallel to the riser 24. A crossover duct 26 connects the top of the riser 24 to the downcomer pipe 28 that is provided with an access way 39 to seal the top of the downcomer pipe 28. The downcomer pipe 28 is provided with at least one vertical window 30. The window 30 is preferably located in the lower half of the downcomer pipe 28 and has a length to diameter ratio of from about 4 to about 8, preferably from about 6 to about 7. For example, for a downcomer pipe 28 having dimensions of a length of about 18 to 19 feet, and a diameter of about 3.5 to 4 feet, a window 30 with dimensions 16 inches in width by 9 feet in length would be suitable. The window 30 may be oriented in any direction, but preferably is oriented toward the riser reactor 24. The centerline of window 30 is oriented about 15 degrees offset to the centerline of the crossover duct 26. A vertical surface is created at the outlet of window 30 that forms a smooth arc that starts at 90 degrees to the window and the arc radius expands to form a smooth transition with the vapor outlet duct 27 that is concentric to downcomer pipe 28. The window 30 allows over 95 percent of the catalyst to separate from the reaction system vapors and exit in a dense catalyst flow out the bottom of downcomer pipe 28.

The bottom of separation unit 10 is provided with a bath tub sealing means 12. Below the sealing means are a dilute stripping section 14 and a dense catalyst bed 16. Also provided in separation unit 10 is an optional post riser quench injector 74, which quenches the separated cracked product vapors issuing out of vapor outlet duct 27. In preferred embodiments of the present invention, quench can also be utilized in the reaction stripping system to further reduce post riser thermal degradation when operating at 1000° F. and above riser outlet temperatures.

Above the top of the vapor outlet duct 27 is located a vapor receiving hood 81 for receiving the vapors issuing from the vapor outlet duct 27. A space 83 is provided between the entrance to the vapor receiving hood 81 and vapor outlet duct 27. The entrance to vapor receiving hood 81 also preferably has a slightly smaller diameter, such that the outer diameter of hood 81 is less than the diameter of the vapor outlet duct 27. The use of a slightly smaller diameter creates space 83. Space 83 allows the bottom of vapor receiving hood 81 to be located in a region that extends from slightly above vapor outlet duct 27 to a position where the vapor receiving hood 81 bottom is below the top of vapor outlet duct 27. This positioning flexibility allows for thermal growth in the process, and in a preferred configuration, the centerline of the vapor receiving hood 81 and vapor outlet duct 27 are the same.

Space 83 allows for creation of catalyst vent 84 that allows catalyst to exit the top of the vapor outlet at low velocity due to the momentum of the catalyst. This feature is particularly important in ensuring low catalyst loading to the cyclones 22 under all operating conditions so that the cyclones 22 can be made smaller and more efficient. The primary function of space 83 is to intake other gases such as stripping steam and stripped hydrocarbons from the upper dilute phase of the containment vessel 20.

Figure 13:
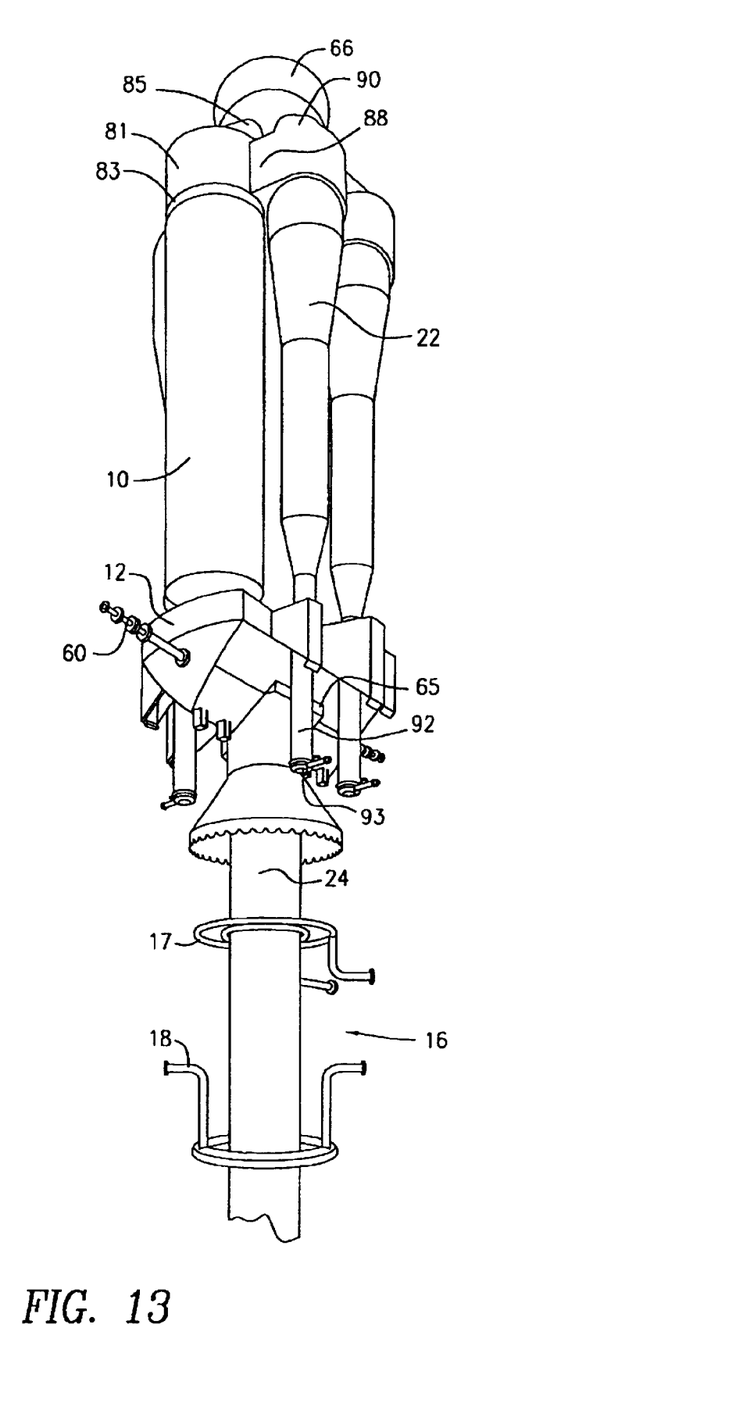
FIG. 13 is a perspective view of the outside of the riser terminator device of the present invention as it appears in a disengaging vessel.

Vapor receiving hood 81 is also preferably close coupled to at least one, preferably two, conventional secondary cyclone 22 through connector ducts 88 (shown in FIG. 13). Connected to the cyclone are a dipleg 92 and a cyclone outlet 90. The cyclone outlet 90 and the vapor receiving hood outlet 85 connect to a plenum 66, that in turn connect to containment vessel outlet 94 for transport of the cracked product vapors for downstream processing.

Figure 2:
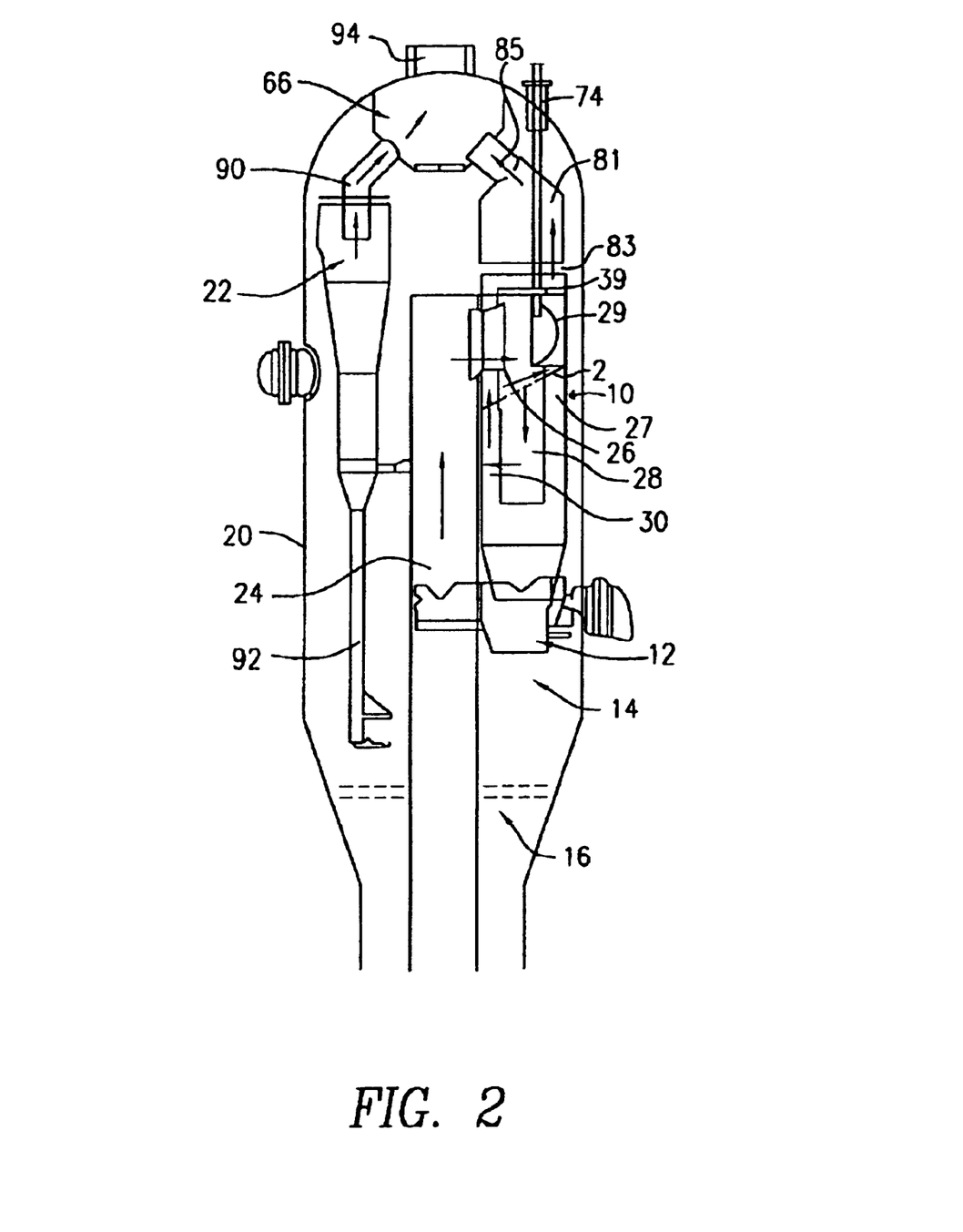
FIG. 2 is a longitudinal section of the preferred riser terminator of the present invention showing the vapor flow pattern.

FIG. 2 shows the general vapor flow pattern in a disengager vessel 20 equipped with a separation unit 10 of the present invention. In FIG. 2, a mixed stream of spent catalyst and cracked product proceeds up to the top of riser 24. The mixed vapor/solids stream exists the riser 24 by making a 90° turn into a crossover duct 26. The vapor is then directed downward through another 90° turn into the downcomer 28 and exits downcomer 28 through window 30. The vapor exiting window 30 is turned by a narrow radius surface and allowed to expand and slow down as it enters the vapor outlet duct. The vapor then turns and proceeds up the vapor outlet duct 27 and exits out the top of vapor outlet duct 27 into vapor receiving hood 81.

Either in vapor outlet duct 27, or as the vapor exits the vapor outlet duct in space 83 or in vapor receiving hood 81, a quench injector 74 may be located, in order to quench a substantial portion of the cracked product, but not to quench a significant amount of catalyst. The quench injector 74 is preferably suspended from the top of the disengager vessel so as to reduce mechanical stress caused by thermal expansion of internal components.

From vapor receiving hood 81, the vapor either exits into one or more, preferably two, close coupled connected cylcone 22 via a duct (not shown) and then into plenum 66 via a duct 90. The cracked vapor then exists the disengager vessel 20 via outlet 94 for downstream processing.

Figure 3:
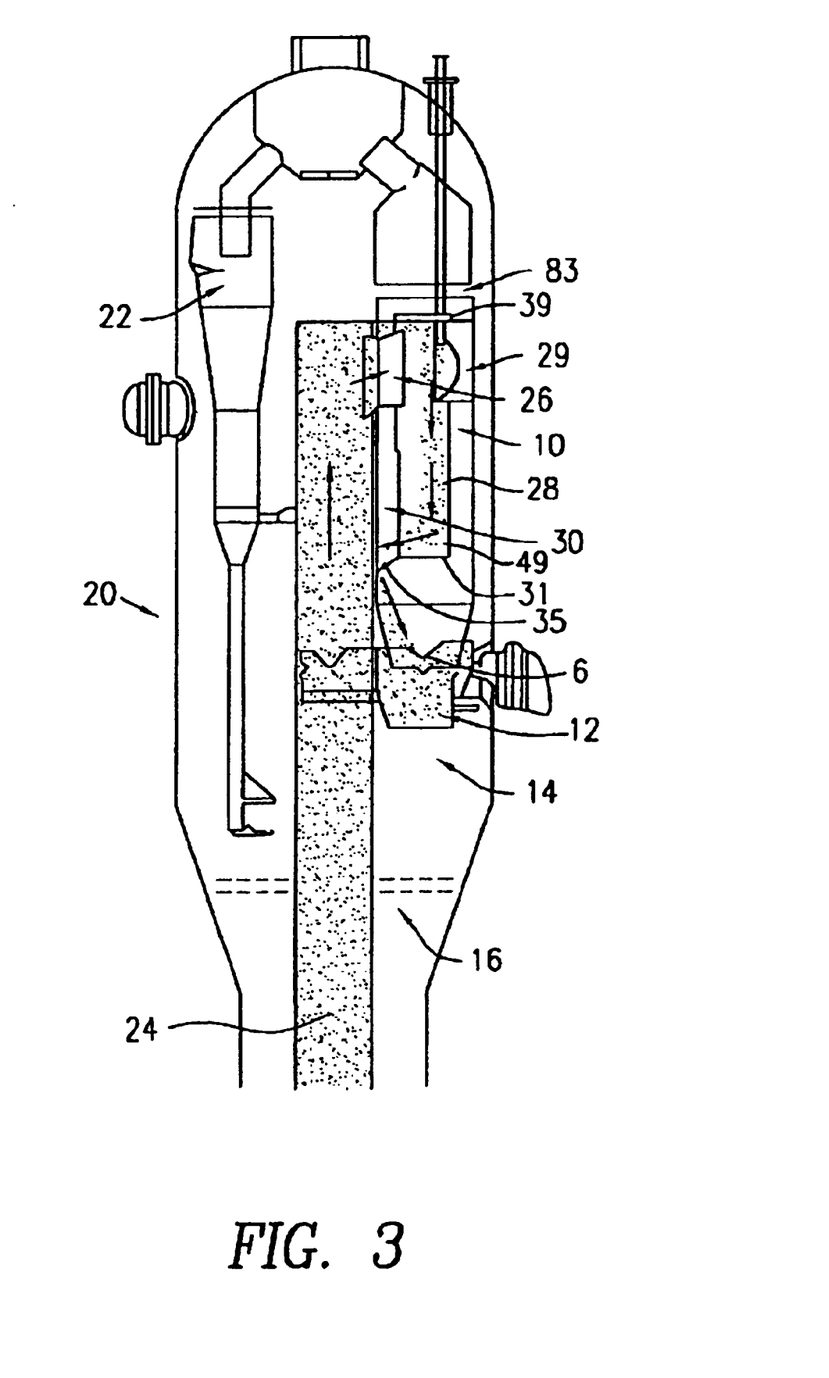
FIG. 3 is a longitudinal section of a preferred riser terminator of the present invention showing the catalyst flow pattern.

Referring to FIG. 3, there is shown the general catalyst flow pattern in a disengager vessel equipped with a separation unit 10 of the present invention. In FIG. 3, a mixed stream of spent catalyst and cracked product proceeds up the riser 24. The mixed vapor/solids stream exits the riser 24 by making a 90° turn into the crossover duct 26. The catalyst stream then impacts on impact plate 29 positioned opposite the crossover duct 26. By positioning the impact plate 29 opposite the crossover duct 26, the generation of vortices in the system is reduced, thus concomitantly reducing any effect on the vapor flow stream and re-entrainment of catalyst. The impact of the catalyst on the impact plate 29 slows down and compacts the catalyst stream thereby further degassing the catalyst stream. The impact plate 29 turns the catalyst stream 90° downward and the catalyst then flows down the internal downcomer pipe 28 to the floor 31 of the downcomer where the catalyst is again slowed and compacted as catalyst bed 49 to further degas the catalyst stream. The floor 31 turns the catalyst stream another 90° to the catalyst distribution plate 35 that allows the catalyst to slide into the bath tub sealing means 12. The catalyst flows along the wall of the separator unit 10 below window 30 and into bath tub sealing means 12 in the form of a turbulent thin film that further enhances the separation of the reaction vapors.

In the sealing means 12, the catalyst may be re-aerated with steam or an inert gas, such as nitrogen. The re-aearated catalyst exits the sealing means 12 at catalyst drains 58 and catalyst distributor slots 6, whereby dilute phase stripping in dilute phase stripping zone 14 occurs to strip hydrocarbons from the spent catalyst particles. The catalyst then falls to dense catalyst bed 16 in the bottom of disengager 20 for additional stripping, withdrawl and regeneration. The stripping and/or aeration gas and any stripped hydrocarbons rise through the upper dilute phase of the disengager vessel 20; and are drawn into vapor receiving hood 81 through space 83, as described hereinabove.

Figure 4:
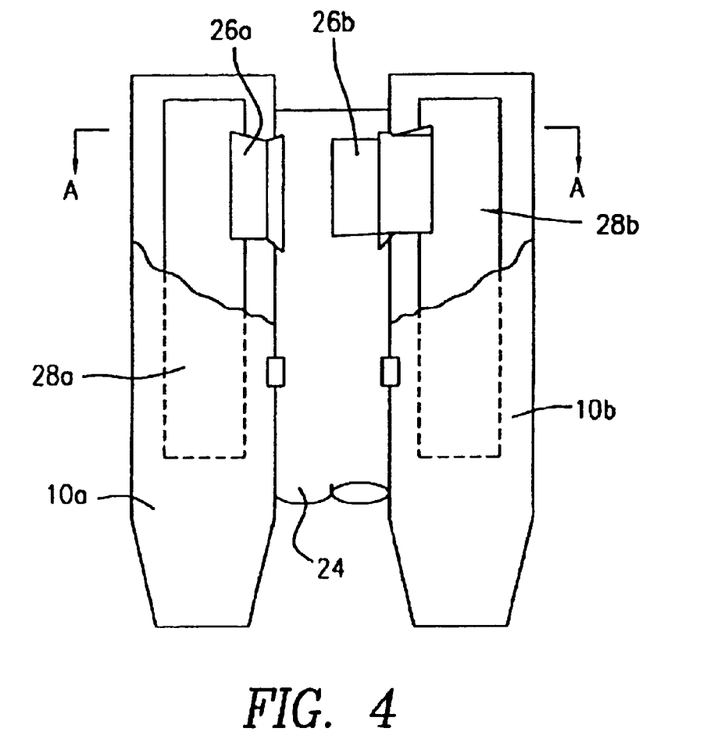
FIG. 4 is a cross section of a preferred riser terminator of the present invention through the downcomer window region.
Figure 5:
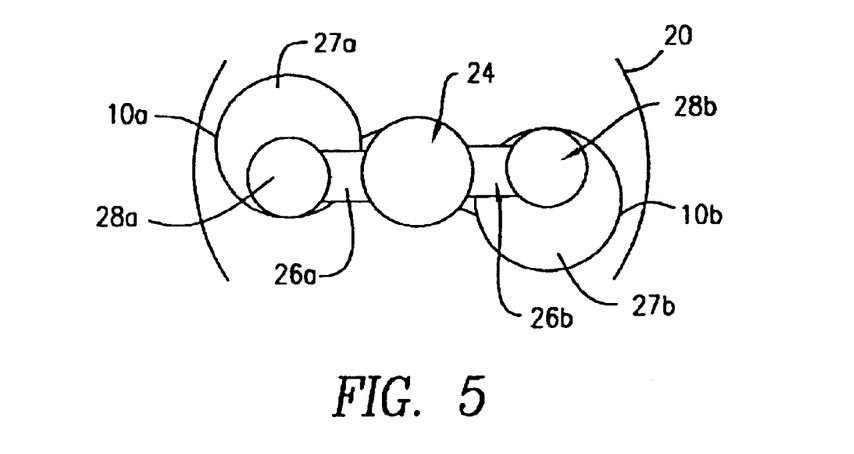
FIG. 5 is a top view of a section of the riser termination device of the present invention taken along the line A—A of FIG. 4.

Referring to FIGS. 4 and 5, there is shown a side view and a top view of a disengager unit 20 having two separation units 10a and 10b. In FIG. 4, there is shown a cut away side view of the system. The centrally disposed riser reactor 24 is provided at the top with two crossover ducts 26a and 26b that connect the riser 24 to the vertical downcomers 28a and 28b of separation units 10a and 10b, respectively. FIG. 5 shows a top view of the system of FIG. 4. along line A—A, wherein the top of riser 24 is connected to internal downcomers 28a and 28b via crossover ducts 26a and 26b, respectively. The separation units 10a and 10b can also be seen as containing vapor outlet ducts 27a and 27b concentric to the respective internal downcomers 28a and 28b.

Figure 6:
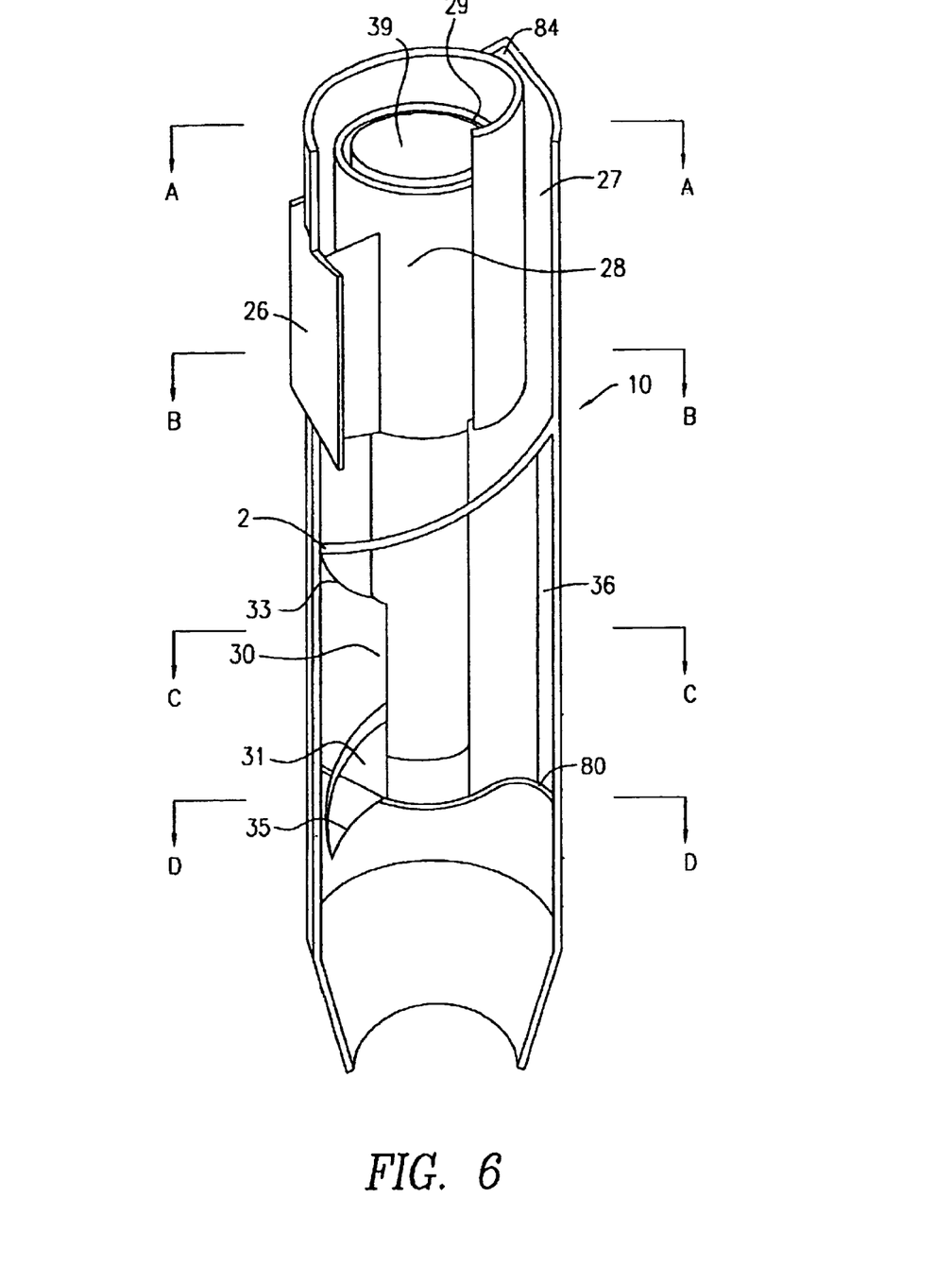
FIG. 6 is a longitudinal section of a separation unit of a preferred riser termination device of the present invention.

FIG. 6 shows a side view of a separation unit 10 of the present invention 90° to the cross over duct 26. Opposite the crossover duct 26 is shown the impact plate 29. The back side of impact plate 29 forms the partition for catalyst vent 84. Extending downward from the impact plate is the internal downcomer 28 capped with downcomer manway 39 and having window 30 located in the bottom portion thereof. At the bottom of the internal downcomer 28 is shown floor 31 with catalyst distribution plate 35. In excess of 95 percent of the catalyst is separated from the vapor prior to the flows passing through window 30 with the catalyst exiting in a dense phase catalyst flow out of the bottom of window 30.

At the outlet of window 30 is the reduced radius vapor contour plate 33 that forces the vapors to turn quickly as then enter vapor outlet duct 27. About 90 percent of catalyst still in the vapor exiting window 30 will plate out on the inner wall of separator 10 and slow down as the vapor velocity is reduced as it enters vapor duct 27. The catalyst plated out here migrates along the inner wall of separator 10 and exits the vapor outlet duct 27 through catalyst shave-off window 36. Spiral baffle 2 is provided to stop the upward flow near the inner wall of separator 10 and direct the plated out catalyst into catalyst shave-off window 36.

Once the catalyst passes through the catalyst shave-off window 36, there is no upward flow of vapor and the catalyst falls through internal dipleg 38 into the bottom of separator 10 below the vapor exit window 30. From there, the catalyst joins the main degassed catalyst flow that exited the bottom of window 30 and together they enter the sealing means 12.

Figure 7:
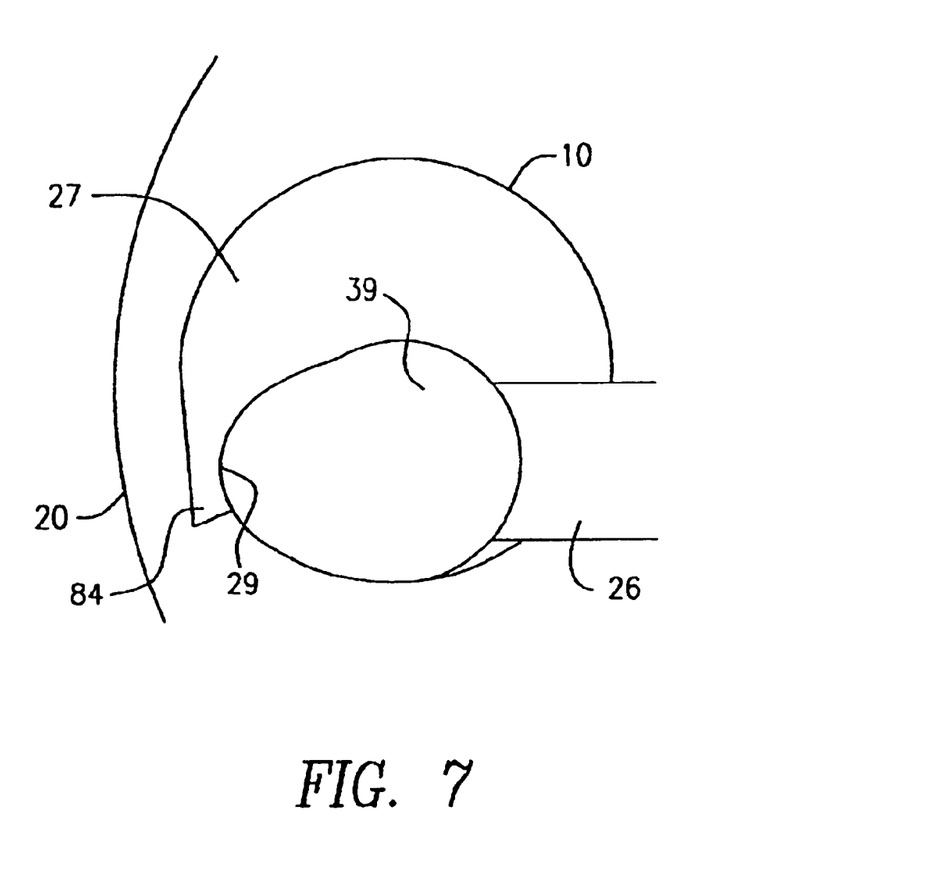
FIG. 7 is a top view of a section of a separation unit of the preferred riser terminator of the present invention taken along line A—A of FIG. 6.

FIG. 7 shows a top view along elevation line A—A of FIG. 6. Referring to FIG. 7, there is seen the disengager vessel 20 and the top of separation unit 10 of the present invention. The top of separation unit 10 is provided with a downcomer manway 39 for covering the internal downcomer and vapor outlet duct 27. Also seen are crossover duct 26 entering the separation unit and catalyst vent 84.

Figure 8:
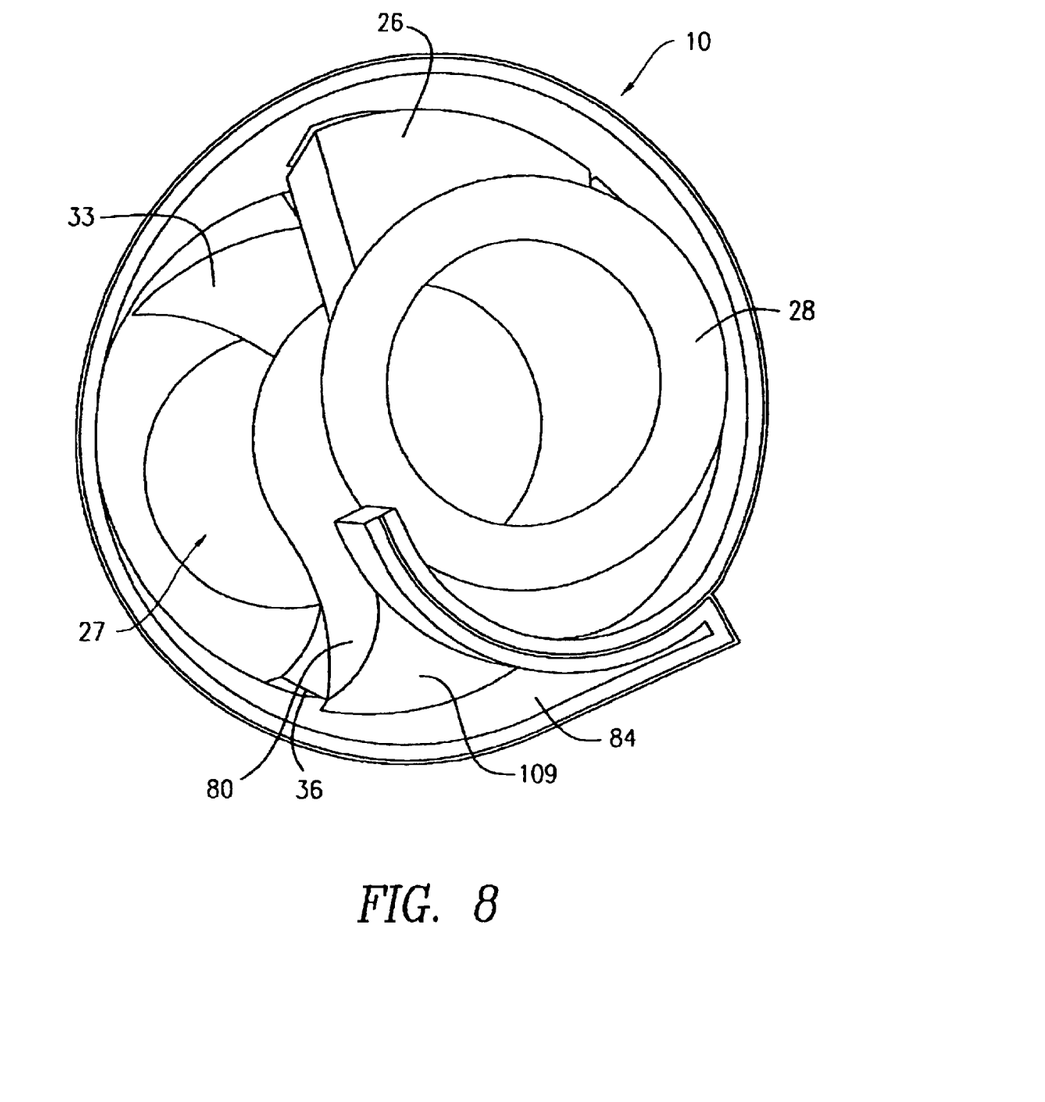
FIG. 8 is a top view of a section of a separation unit of the preferred riser terminator of the present invention taken along line B—B of FIG. 6.

FIG. 8 shows a top view along elevation line B—B of FIG. 6. Referring to FIG. 8, there is seen a separation unit 10 of the present invention. Separation unit 10 has an internal downcomer pipe 28 operatively connected to the riser reactor (not shown) via crossover duct 26. Reduced radius vapor contour plate 33 is shown at the outlet of downcomer window 30 along with catalyst shave-off window 36. The top of the internal dipleg is shown by plate 109. The catalyst that is plated out in this second stage of catalyst separation drops out the bottom of the internal dipleg.

The flow exiting window 30 is bounded by baffle wall 80 which forms a smooth path for the vapor to flow up vapor outlet duct 27 and separate from the catalyst directed toward the catalyst shave-off window 36. The spiral baffle 2 is not shown.

Figure 9:
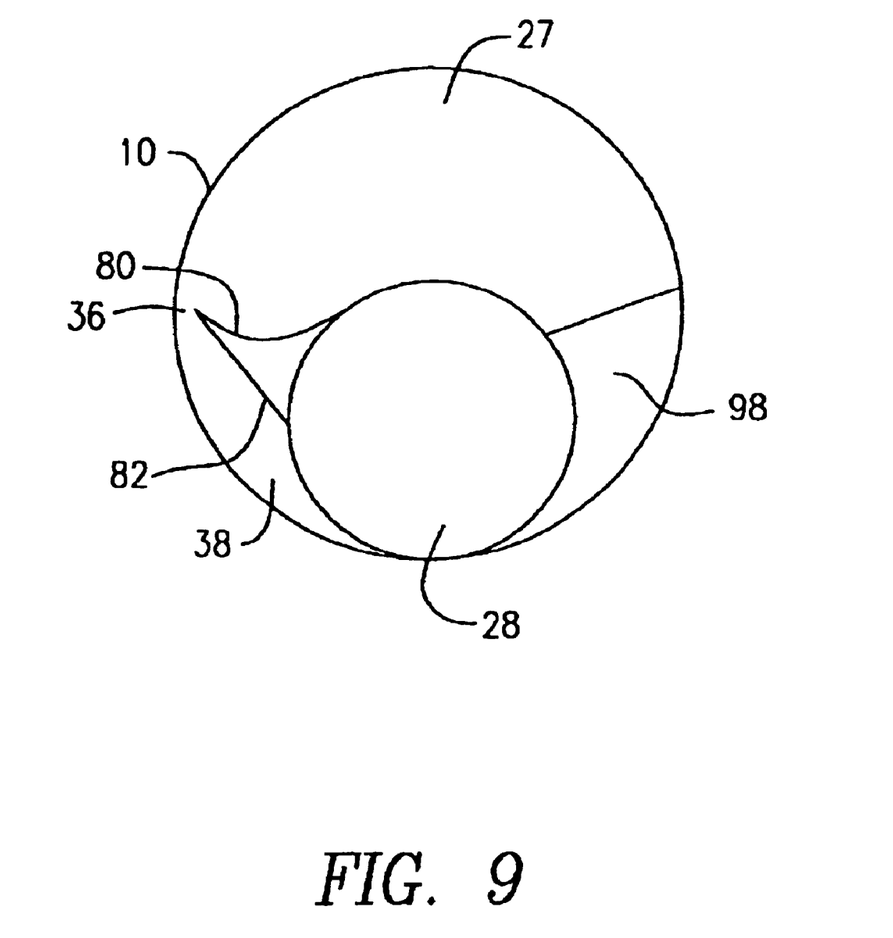
FIG. 9 is a top view of a section of a separation unit of the preferred riser terminator of the present invention taken along line C—C of FIG. 6.

FIG. 9 shows a top view along elevation line C—C of FIG. 6. Referring to FIG. 9, there is seen a separation unit of the present invention. Separation unit 10 has an internal downcomer pipe 28 and a vapor outlet duct 27. Plate 98 provides support for downcomer pipe 28 and bounds the top of vapor flow through window 30 forcing the vapor to flow horizontally out of window 30 along reduced vapor contour plate 33. The plated out catalyst exits through catalyst shave-off window 36 and falls to the bottom of separator 10 through internal dipleg 38. Baffle 80 is supported by supporting rod 82.

Figure 10:
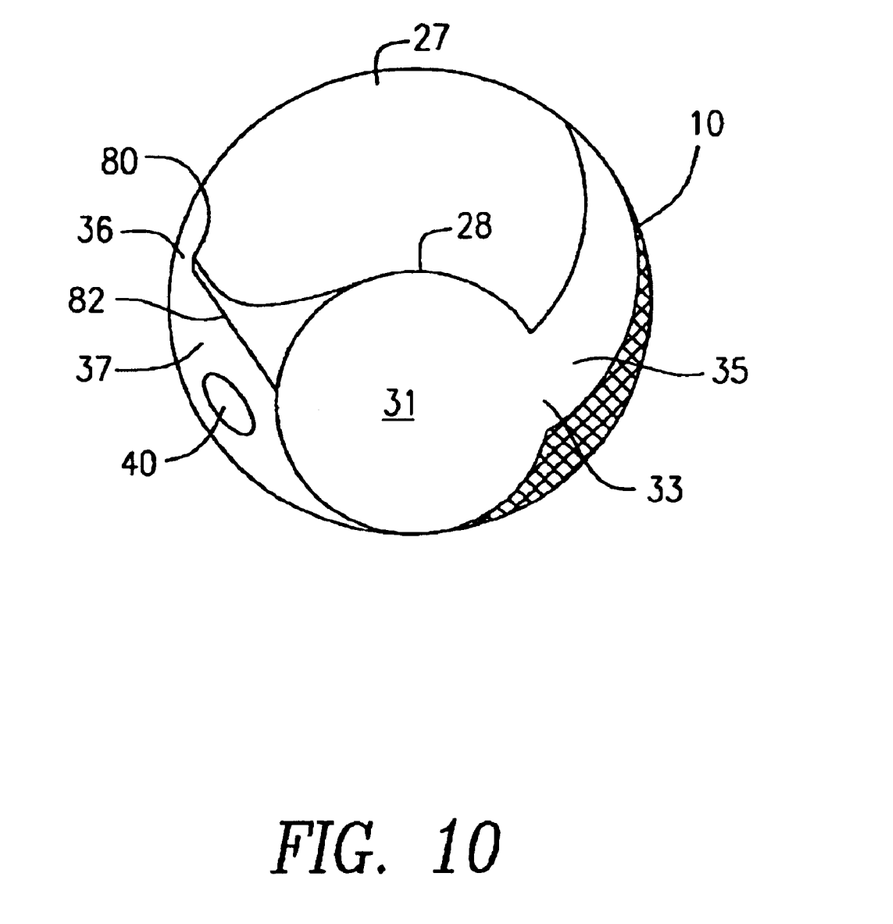
FIG. 10 is a top view of a section of a separation unit of the preferred riser terminator of the present invention taken along line D—D of FIG. 6.

FIG. 10 shows a top view along elevation line D—D of FIG. 6. Referring to FIG. 10, there is seen a separation unit 10 of the present invention. The separation unit 10 has an internal downcomer pipe which has a floor 31 provided with a catalyst distributor plate 35 supported by support 33. Floor 31 is supported by internal dipleg bottom plate 37. Dipleg bottom plate 37 contains internal dipleg catalyst outlet. The catalyst that enters through catalyst shave-off window 36 exits through dipleg catalyst outlet 40. Baffle 80 and support rod 82 are supported by downcomer pipe 28.

In operation, the catalyst falling down the internal downcomer pipe will contact the floor 31 of the downcomer pipe 28 and form a bed 49 of catalyst (as seen in FIG. 3). The forming of the bed 49 slows down and compacts the catalyst thereby achieving further degassing. The vapor degassed from bed 49 will rise and exit the internal downcomer pipe 28 out the vertical downcomer window 30. The catalyst in bed 49 exits the internal downcomer pipe 28 by sliding downward along catalyst distribution plate 35 and the inner wall of the bottom of separator 10. The catalyst then exits separator 10 and falls into the bath tub sealing means (not shown) for stripping.

Gases separated after the initial contact with the distribution plate 29 and degassed from bed 49, along with any entrained catalyst are directed horizontally out of the vertical window 30 against reduced radius vapor contour plate 33 and allowed to expand into the vapor outlet duct 27. The gas slows as it expands into vapor outlet duct 27 and is directed upwards in a smooth flow pattern as bounded by vapor contour baffle 80. Spiral baffle 2 further facilitates the separation of the upward moving vapor and plated out catalyst that exits through shave-off window 36.

At the top of the vapor outlet duct, any remaining catalyst is directed into catalyst vent 84 to minimize catalyst loading in cyclone 22 by forcing the catalyst to bypass vapor receiving hood 81. The catalyst flow through this path is normally very low at a small fraction of one percent of catalyst flowing though riser 24. This path provides insurance against any high catalyst loading reaching cyclones 22. In normal operation, the small catalyst flow assists in providing a dusting of catalyst to preferentially absorb coke forming hydrocarbons. The catalyst then falls to dense bed 16.

Above 99 percent, and generally in excess of 99.9 percent of the catalyst is separated by the separation unit 10. The separation of the catalyst is effected in a manner such that the catalyst is separated without a gas vortex thereby allowing for a much higher level of recovery of fine material. The vapor velocities are also less than conventional cyclones so the quantity of fine catalyst generated in the separator is very low and the separator pressure drop is less than a cyclone based system.

The separation system of the present invention provides containment of the hydrocarbon to a very small post riser volume. The volume required for the separation is less than required by a cyclone 22 and a vortex is not generated. This substantially reduces both post riser thermal and catalytic cracking. The characteristics of the reaction and separation system allow the process to run hotter, which further reduces the quantity of heavy polar materials that enter the separation unit 10. A fundamental shift in the product hydrogen distribution and the ability to operate at extremely high catalyst/oil ratios results in superior product yields and quality.

Figure 11:
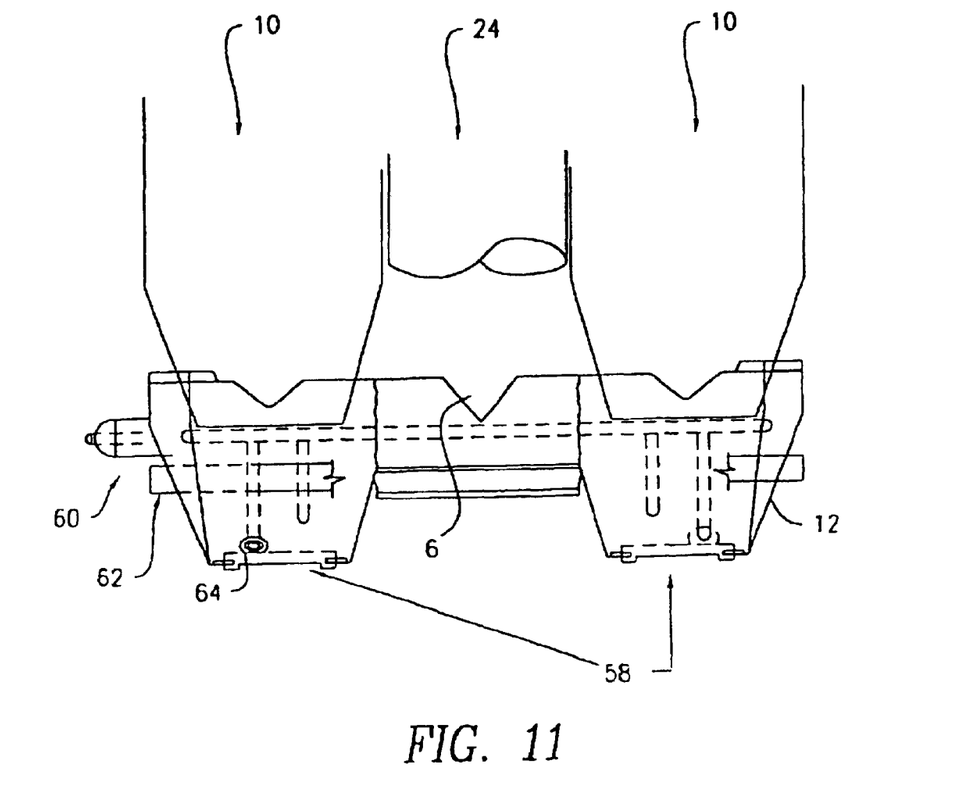
FIG. 11 is a cross section of the riser terminator device of the present invention showing a pair of separation units inserted into a bath tub.

FIG. 11 shows a cross sectional view along the bottom of the separator units 10 of the present invention. In FIG. 11 there can be seen two separator units 10 on the sides of the riser reactor 24. The separator unit bottoms 10 are sealed with a bath tub sealing means 12. The bath tub sealing means 12 is supported in the disengaging vessel by means of at least one support beam 62. Steam may be added to the bath tub sealing means 12 through a steam distributor 60, which feeds steam nozzles 64. The top of the bath tub sealing means 12 is provided with a catalyst distributor slot 6 and the bottom of the bath tub sealing means is provide with drains 58.

Figure 12:
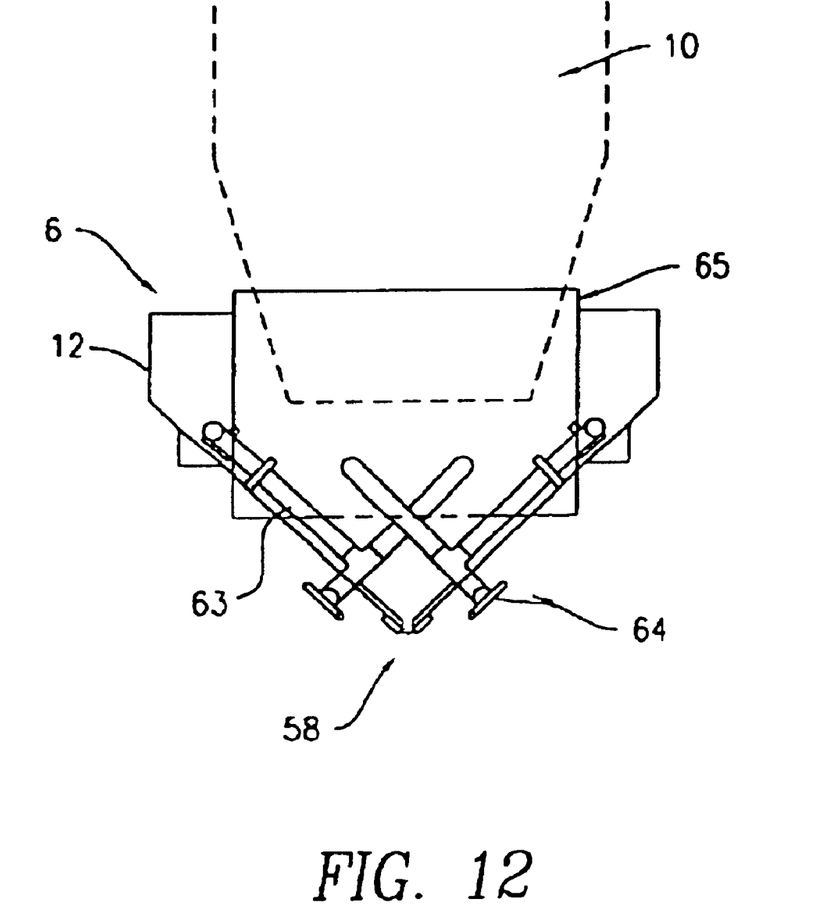
FIG. 12 is a cross section of the riser terminator device of the present invention showing a separation unit inserted into a bath tub at an angle 90° to FIG. 1.

A side view of the bath tub sealing means can be seen in FIG. 12 wherein the bath tub sealing means 12 is located under the bottom of the separation unit 10. Steam is supplied to the bath tub sealing means 12 via injector steam nozzles 64 attached to the steam distributor (not shown) by manifold means 63. A collar 65 is provided on the bath tub sealing means to fit around the riser reactor (not shown). Catalyst removal is effected by catalyst distributor slots 6 and catalyst distributor drains 58.

In operation, the catalyst from distribution plate 35 and internal dipleg 36 falls into the bath tub sealing means 12 wherein it is fluidized by addition of steam through nozzles 64. The fluidized catalyst entrained with steam then exits the bath tub sealing means 12 by overflowing out the top or through the distribution slots on the sides and bottom of the bath tub sealing means 12 through catalyst distributor slot 6. With the majority of interstitial gas removed from catalyst flowing out the bottom of the separation unit 10, the void volume in the flowing catalyst can be readily adjusted with the stripping gas supplied by the steam distribution system. The re-aerated catalyst is then redistributed by the bath tub sealing means 12 into the dilute stripping zone 14 above a conventional dense bed 16 for additional stripping if desired.

The re-aeration step of the catalyst in the catalyst bath tub sealing means 12 significantly lowers the hydrocarbon steam partial pressure surrounding the catalyst, and thus facilitates the removal of residual high boiling material from the catalyst prior to the catalyst entering the dilute phase stripping zone.

The dense bed 16 can have multiple zones of steam addition and partitioning as commonly practiced in the art. Due to the position of the dilute phase stripping zone 14, catalyst flux rates can be higher than conventionally practiced with lower levels of steam in the dense bed stripping zone.

The bath tub sealing means 12 and steam distributor 60 provides a dense phase catalyst seal for the reaction gases in the primary separation unit 10. The catalyst seal is independent of level of the catalyst in the dense bed 16. Catalyst inventory, dense bed catalyst residence time and catalyst circulation hydraulic can therefore be decoupled from the sealing means 12.

The catalyst exiting from the bath tub sealing means 12 steam distributor 60 is re-aerated as it overflows the bath tub sealing means 12 and is contacted by relatively high purity steam as it falls through the dilute stripping zone. Since the hydrocarbon flux entering the conventional dense bed 16 has been greatly reduced, the quantity of hydrocarbon in both the dilute stripping zone and dense bed zone is greatly reduced.

The stripped hydrocarbons and steam proceed upwardly in disengager 20 and are drawn into vapor receiving hood 81 through space 83 for further separation of any entrained catalyst particles and exiting the system for downstream processing.

Referring to FIG. 13 there is shown a perspective view of the inside of the disengager vessel 20. In FIG. 13 there is shown riser 24 that is connected to a riser termination device 10 of the present invention. The vapor receiving hood 81, located above space 83, is supported by plenum 66 via hood outlet 85. The vapor receiving hood 81 is also seen to be connected to a cyclone separator 22 via connector duct 88. Cyclone 22 is provided with a dipleg 92 having a sealing means 93, which may comprises any sealing means known to those skilled in the art. Below separator unit 10 is located the bath tub sealing means 12, equipped with steam distributor 60, and box collar for fitting around riser 24. Also, located in the portion of the disengager 20 where the dense bed of catalyst 16 will be found during operation, are steam distribution rings 17 and 18.

EXAMPLE

In a comparative run, the results of employing a conventional T-type separator were compared against a separator device of the present invention. The results are shown in the table below.

| Parameter | T-separator | Present Invention | Change |
|---|---|---|---|
| Feed, mbpd | 38 | 37 | |
| ° API | 25.8 | 26.3 | |
| Riser Feed Temp., ° F. | 566 | 633 | 67 |
| Riser Outlet Temp., ° F. | 978 | 996 | 18 |
| Catalyst Circ. rate (ton/min) | 29.31 | 33.34 | 4.03 |
| Catalyst/Oil ratio (lb/lb) | 7.21 | 8.24 | 1.03 |
| Delta Coke (lb/lb) | 0.825 | 0.577 | −0.25 |
| Recycle decant oil (bpd) | 1229 | 918 | −311.72 |
| Regenerator overhead temp., ° F. | 1293 | 1310 | 16.57 |
| Dense phase temp., ° F. | 1275 | 1254 | −20.54 |
| Slurry BS&W (vol %) | 0.37 | <0.10 | >0.27 |
| Yield | 113.96 | 115.04 | 1.08 |

From the above table, the many advantages of the present invention can be observed. The use of the riser termination device of the present invention allows for the use of higher catalyst to oil ratios with reduced delta coke resulting in higher yields. Further, the amount of decant oil for recycling is reduced indicating that the catalytic cracking in the riser is more effective at cracking the feed the first time around. The reduction in slurry solids as indicated by the BS&W reduction demonstrates the enhanced catalyst containment characteristics of the separation system. Accordingly, one skilled in the art will appreciate the improved processing made possible by the riser terminator device of the present invention.

The above-mentioned patents are all hereby incorporated by reference.

Many variations of the present invention will suggest themselves to those skilled in the art in light of the above-detailed description. All such obvious variations are within the full-intended scope of the appended claims.

What is claimed is:

1. A bath tub solids container for containing solids seperated from cracked product vapors produced in a riser reactor and issuing from a separator, said bath tub solids container comprising: a containment means for receiving and containing solids from said separator; a collar for fitting around said riser reactor and keeping said bath tub solids from contacting said riser reactor; an aeration means for fluidizing solids cotained in said containment means; and a fluidized solids outlet means for allowing fluidized solids to exit the containment means.

2. A bath tub solids container as defined in claim 1 wherein said bath tub device aeration means comprises steam nozzles for injecting steam into said containment means.

3. A bath tub solids container as defined in claim 2 wherein said bath tub device fluidized solids outlet means comprises at least one catalyst distributor overflow slot and one catalyst drain point.

* * * * *